June 6, 1972 L. H. McKEE 3,667,947

COLOR CRT SCREEN EXPOSURE METHOD

Original Filed Nov. 1, 1967 4 Sheets-Sheet 1

INVENTOR.
LEFLER H. McKEE

BY Donald R. Castle

ATTORNEY

COLOR CRT SCREEN EXPOSURE METHOD

Original Filed Nov. 1, 1967

INVENTOR.
LEFLER H. McKEE
BY
Donald R. Castle
ATTORNEY

June 6, 1972 L. H. McKEE 3,667,947

COLOR CRT SCREEN EXPOSURE METHOD

Original Filed Nov. 1, 1967 4 Sheets-Sheet 3

INVENTOR.
LEFLER H. McKEE

BY Donald R. Castle

ATTORNEY

COLOR CRT SCREEN EXPOSURE METHOD

Original Filed Nov. 1, 1967 4 Sheets-Sheet 4

INVENTOR.
LEFLER H. McKEE
BY
Donald R. Castle
ATTORNEY

United States Patent Office 3,667,947
Patented June 6, 1972

3,667,947

COLOR CRT SCREEN EXPOSURE METHOD

Lefler H. McKee, Seneca Falls, N.Y., assignor to Sylvania Electric Products Inc.

Original application Nov. 1, 1967, Ser. No. 679,869, now Patent No. 3,559,546, dated Feb. 2, 1971. Divided and this application Sept. 4, 1970, Ser. No. 69,815
Int. Cl. G03c 5/00
U.S. Cl. 96—36.1 6 Claims

ABSTRACT OF THE DISCLOSURE

A method for light forming a cathode ray tube patterned screen utilizing unattenuated radiant energy of the light source. A photosensitive phosphor-containing coating disposed on the screen panel is exposed, through an adjacently positioned negative mask, by radiant energy of substantially constant intensity from a substantially unattenuated direct light source oriented within an apertured light enclosure. Since the utilized area of the light source is smaller than the discrete aperture area, the light source is moved in a predetermined manner relative to the aperture to effect a simulated light source area equalling the aperture area.

CROSS REFERENCE TO RELATED APPLICATION

This application is a divisional application of Ser. No. 679,869, filed Nov. 1, 1967, which issued as U.S. Pat. 3,559,546 on Feb. 2, 1971, and is assigned to the assignee of the present invention.

BACKGROUND OF THE INVENTION

This invention relates to cathode ray tubes and more particularly to a method utilized in photoforming patterned screens for cathode ray tubes.

In the photo-exposure of discretely patterned cathode ray tube screens, especially those employed in color tubes, it has been conventional practice to use an optical system wherein a primary light source is used to produce a secondary or point light source. Usually the primary source is in the form of light conduit means such as a quartz rod, which collects and transfers, by internal reflections, a portion of the radiant energy from the lamp to provide the secondary or point source of light for screen exposure.

It is conventional practice in manufacturing screens for certain types of color cathode ray tubes to form patterns of electron responsive color emitting phosphors on the interior of the tube face panel by utilizing light sensitive adhering material. To effect the adherence of specific areas or dots of each color phosphor, the face panel having a coating of light sensitive material and a phosphor disposed thereon, is spacedly mated with a suitable negative or foraminous shadow mask. The combination is positioned on a screen exposure or "lighthouse" apparatus wherein radiant energy is beamed from the point light source, through a corrective lens, to the discretely masked screen.

The activating radiant energy from the light source traverses the lens, and is directed thereby to pass through the individual openings in the mask and impinge upon definite phosphor areas of the screen. Thus, these light impinged areas are activated to form phosphor adhering dots that are oriented to receive subsequent electron impingement from a specific directed electron beam in the finished tube. In this manner, each of the separate color fields comprising the tube screen are individually activated by separate optical projection systems precisely positioned off-center from the axis of the screen thereby approximating the subsequent orientation of the separate electron beams associated with the respective colors. By this procedure, radiant energy emanating from each light source traverses the same mask openings and thence impinges upon a different set of screen areas for each color field. In each instance, the unexposed or unhardened screen areas are removed by subsequent processing development. This procedure is repeated for each of the dot color fields making up the patterned screen of the tube.

Certain difficulties have been evidenced in the system utilizing the quartz rod and lamp combination. Since the one kilowatt lamp generates a great amount of heat, an elaborate forced-air cooling system is required to maintain a lamp temperature commensurate with desired lamp life. The manufacture and distribution of the forced-air required for lamp cooling contributes an appreciable production cost. In addition, incorporating adequate means within the lamp reflector to facilitate air cooling increases costs in that area and detracts from the reflective characteristics of the reflector. Another difficulty resides in the quartz light collector which attenuates from 15 to 20 percent of the ultraviolet portion of the radiant energy spectrum supplied by the lamp, thereby reducing the efficiency of the point light source.

OBJECTS AND SUMMARY OF THE INVENTION

It is an object of the invention to reduce the aforementioned difficulties and to provide an improved optical method for photo-exposing patterned cathode ray tube screens wherein efficient utilization of the radiant energy output of the primary light source is achieved in an efficient and economical manner.

Another object is to provide a method for screen exposure wherein radiant energy beamed from the light source to the screen includes substantially the maximum amount of ultraviolet energy emanating from the source in the direction of the screen.

The foregoing objects are achieved in one aspect of the invention by the provision of a method for light forming a patterned cathode ray tube screen. The screen panel having a light sensitive material and a phosphor disposed thereon is photo-patterned in accordance with an adjacently positioned negative-type mask. Radiant energy is beamed through the mask from an unattenuated direct light source contained within a light enclosure having an aperture therein oriented toward the masked screen. The light source, located close to the aperture and having a utilized light area smaller than the area of the aperture, is moved in a predetermined manner relative to the aperture to provide a simulated light source area that at least equals the aperture area. Since the light source is unattenuated, the maximum amount of ultraviolet energy produced by the lamp in the direction of the screen is beamed thereto.

DESCRIPTION OF THE PREFERRED EMBODIMENT

For a better understanding of the present invention, together with other and further objects, advantages, and capabilities thereof, reference is made to the following specification and appended claims in connection with the aforedescribed drawings.

Figure 1:
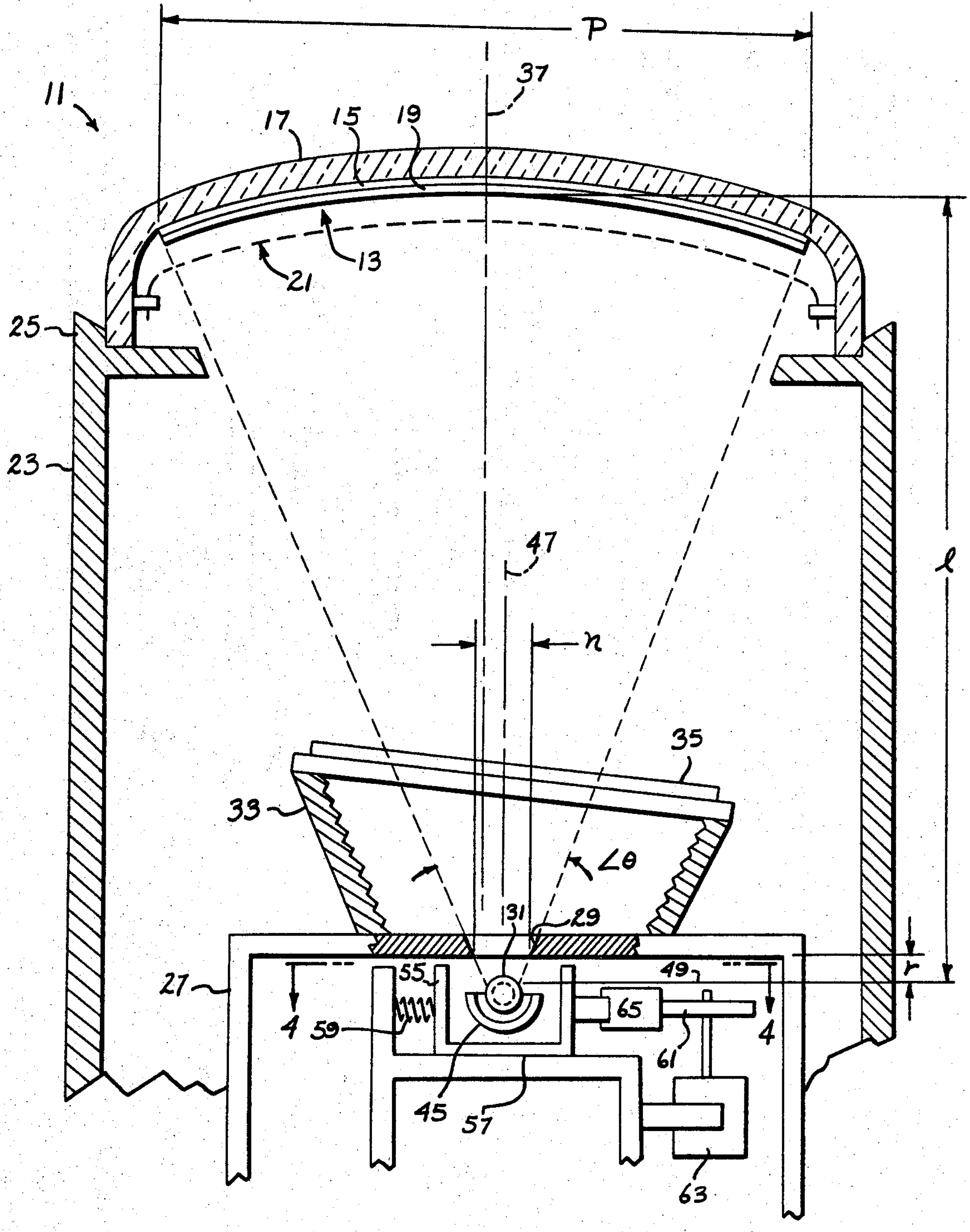
FIG. 1 is a cross-sectional view of a cathode ray tube color screen exposure apparatus.

With reference to the drawings, in FIG. 1, there is shown a "lighthouse" or screen exposure apparatus 11 which is utilized for photographically activating a foraminously masked light sensitive screen 13 of a color cathode ray tube. This "lighthouse" apparatus is repetitively used to separately activate a plurality of specific color dot areas for each of the respective color fields constituting the patterns of the screen.

In greater detail, screen 13 comprises a coating of a photoresist or light sensitive substance 15, such as polyvinyl alcohol sensitized with ammonium dichromate, disposed on the interior surface of the glass face panel 17 and overlaid with specific electron responsive fluorescent phosphor materials 19 as by spraying or dusting. If so desired, the light energy sensistive material 15 and the phosphor material 19 may be initially intermixed to form a slurry which may be subsequently deposited on the panel 17. Positioned adjacent screen 13, in spaced relationship thereto, is a foraminous shadowmask 21 to provide discrete masking of the screen material so that only the desired areas of the screen will be exposed for any given color activation operation to provide a distinct pattern of dots of the specific color. The glass face panel 17, with the light sensitive and phosphor materials disposed thereon and the shadowmask spacedly mounted therein, is placed upon the "lighthouse" frame 23 and aligned therewith by frame projections 25.

Positioned within the "lighthouse" frame is a light enclosure 27 having an aperture 29 therein. Located directly therebeneath is a direct light source 31, such as a mercury-vapor lamp of a wattage not requiring forced-air cooling for efficient operation. For example, it has been found that lamps in the 200–400 watt range fulfill this criteria.

The direct light source and the related aperature comprise the basics of the optical system by which light is beamed to the screen. Mounted on a suitable support 33 above the apertured light enclosure, and in spaced relationship thereto, is a corrective lens 35 which refracts the light rays in a manner to provide desired activation of the full screen. Thus, the end points of the light rays utilized in the exposure operation are directed to match the landing points of the electrons during subsequent tube operation. The direct light source 31 and related aperture 29 along with the corrective lens 35 are offset at predetermined distances from the axis 37 of screen 13 for each of the separate color exposures comprising the screen information. Positioning means are provided for orienting the optical system in the distinct positions for each color exposure.

With particular reference to FIGS. 1 through 5, the direct light source 31 is a 200 watt mercury arc lamp which emits appreciable ultraviolet radiation in wavelengths ranging substantially from 3000 to 5000 angstroms. This radiant energy emission is particularly desirable for promoting polymerization of the sensitized polyvinyl alcohol component of the screen. When the lamp 31 is energized, an arc or luminous area 39 is formed between electrodes 41 and 42 whereof a utilized light portion or intense area 43 has a longitudinal dimension $x$ and a diametrical dimension $y$ with a transverse axis $z$ substantially coinciding with the aperture axis 47 when the light source is on center. A substantially spherical reflector 45 is positioned adjacent the lamp to collect and reflect a portion of the radiant energy that would otherwise be lost.

The aperture 29 has a diameter $n$ in keeping with the optical dimensions of the exposure system. Such dimensions include the distance $l$ between the plane 49 of the utilized portion of the light source and the screen 13, the breadth $p$ of the screen, and the spacing $r$ between the plane of the utilized portion of the light source and the aperture.

In exposing a cathode ray tube color screen, for example, a 19 inch rectangular panel, the distance $l$ from the center of the screen to the plane 49 of the utilized portion of the direct light source is approximately 11.000 inches. The spacing $r$ between the plane of the aperture 29 and the plane of the utilized light source is in the order of 0.250 inch. The deflection angle $\angle\theta$ of exposure light as defined through the axis of the aperture to the periphery of the screen, is in this instance, approximately 85 degrees. The aperture 29 has a diameter $n$ in the order of 0.500 inch. In view of the light deflection angle $\angle\theta$, the effective aperture in the plane of the light source 29' has a diameter $m$ of approximately 0.120 inch.

The longitudinal dimension $x$ of the utilized portion of the area 43 is approximately 0.140 inch with the diametrical dimension $y$ being about 0.070 inch. As a whole, the utilized light source area 43 is smaller than the aperture proper 29, but larger than the effective aperture 29' at the plane of the light source. Since the screen "sees" light as defined by the effective aperture 29', the light source is moved in a predetermined manner to provide a simulated light source area at least equalling the area of the effective aperture. This is accomplished by moving the light axis $z$ in the plane of the aperture axis by substantially equal distances $b$ and $b'$ on either side of the aperture axis 47, in a lateral plane substantially parallel to the plane of the aperture 29, to effect the full required movements $c$ of the utilized portion 43 of the light source.

Figure 3:
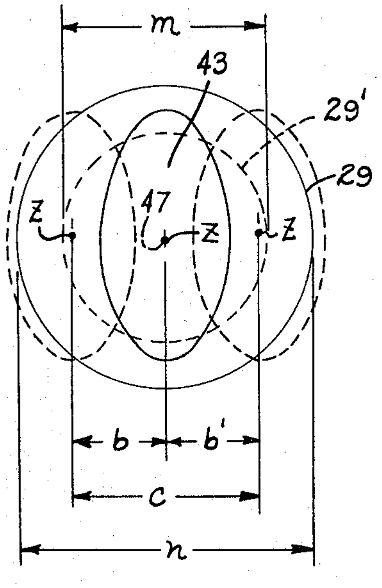
FIG. 3 is an enlarged plan view of the light enclosure aperture showing predetermined movement of the utilized light source relative thereto.
Figure 2:
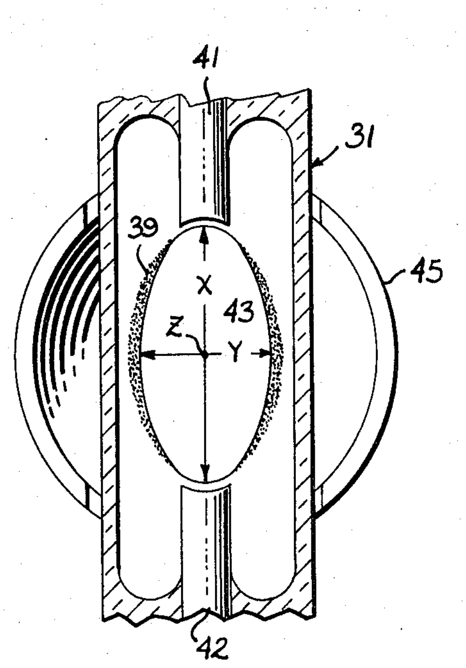
FIG. 2 is an enlarged plan view of the direct light source shown in FIG. 1.

With particular reference to FIG. 3, the range of lateral movement $c$, of the utilized portion of the light source 43, consummates adequate coverage of the effective aperture 29' to effect the simulated area of unattenuated radiant energy emission.

It is to be understood that the illustrative dimensions and exaggerated drawings are not intended to be limiting.

Figure 4:
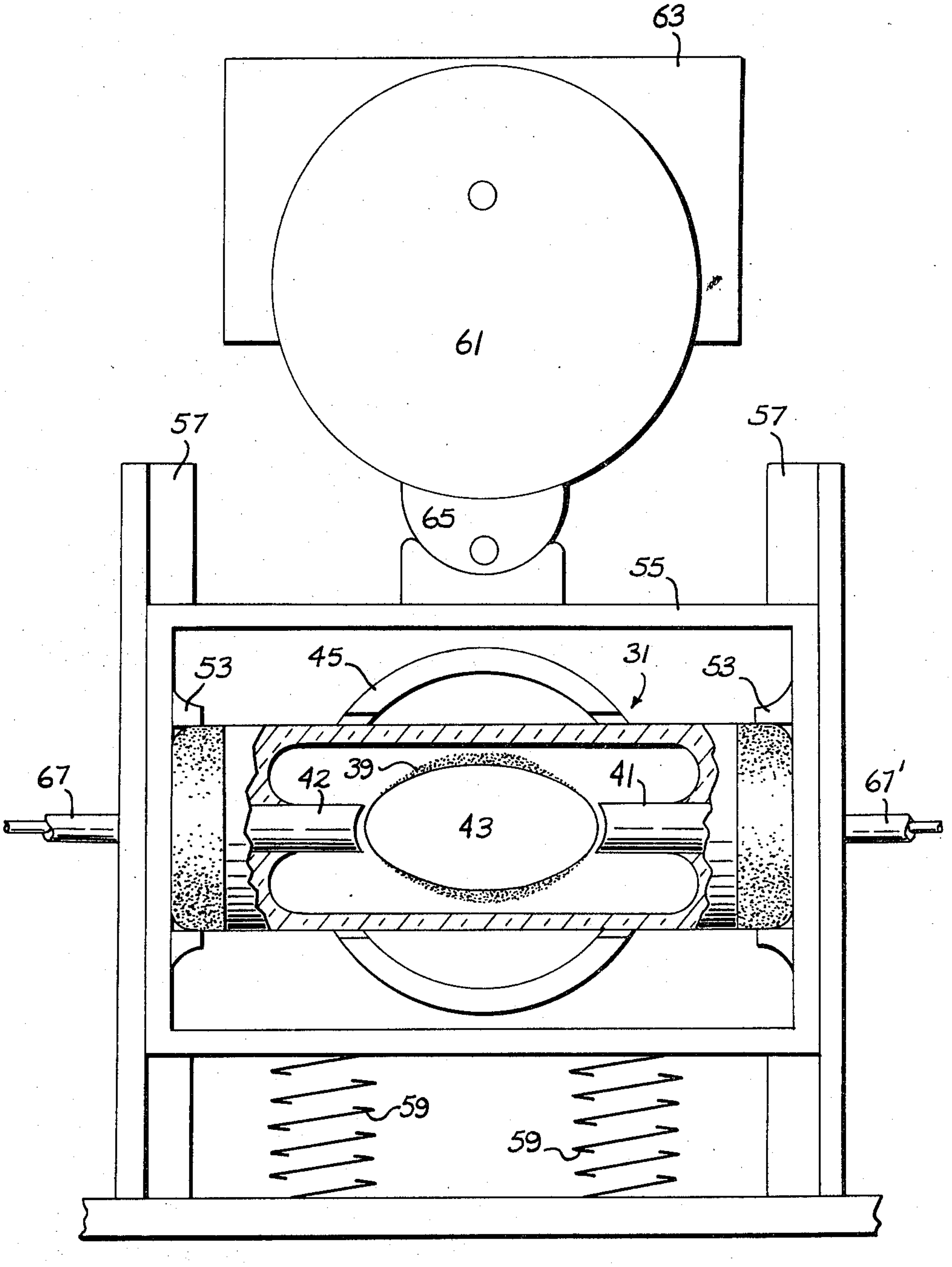
FIG. 4 is a plan view showing one means for effecting predetermined movement of the direct light source taken along the line 4—4 of FIG. 1.

Movement of the light source with reference to the aperture is accomplished by several means. One embodiment as illustrated in FIGS. 1 and 4, shows the direct light source or lamp 31 suitably mounted by holders 53 within a partial closure 55 which is open toward the aperture. The partial closure is formed to slide in a reciprocatng manner on track members 57. The reciprocating movement is furnished to the partial closure by the cooperation of spring means 59 on one side of the closure and a rotating eccentric member 61 on the other. The member, powered by motor means 63, mates with a pivoted shoe 65 which is linked to the closure 55. Flexible electrical connections 67 and 67' facilitate movement of the closure oriented lamp.

Figure 6:
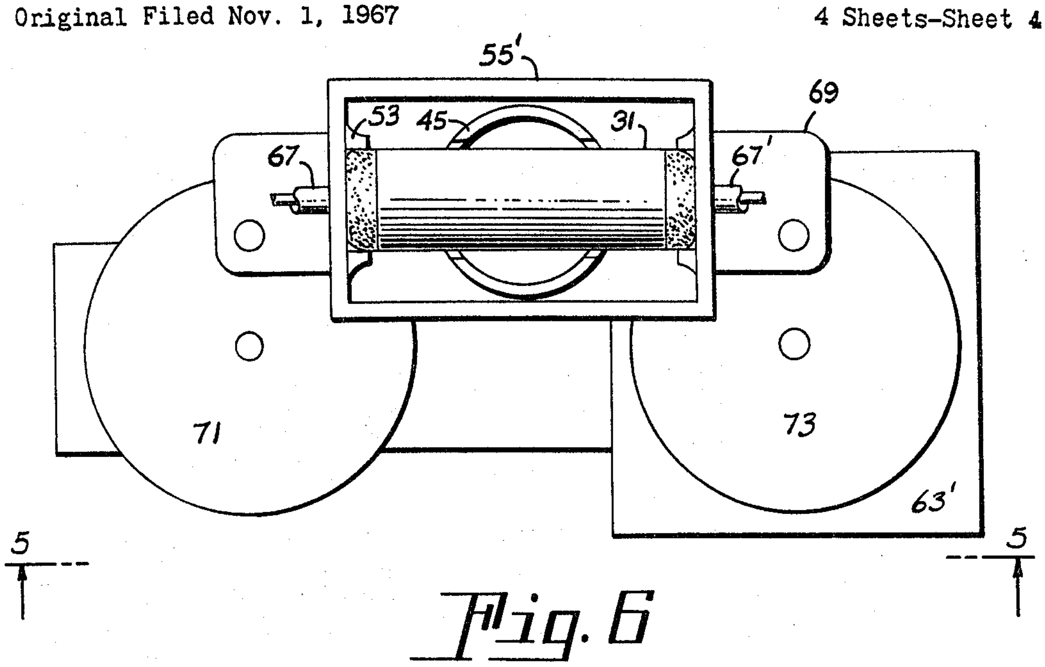
FIG. 6 is a plan view of the embodiment shown in FIG. 5 taken along the line 6—6 thereof.
Figure 5:
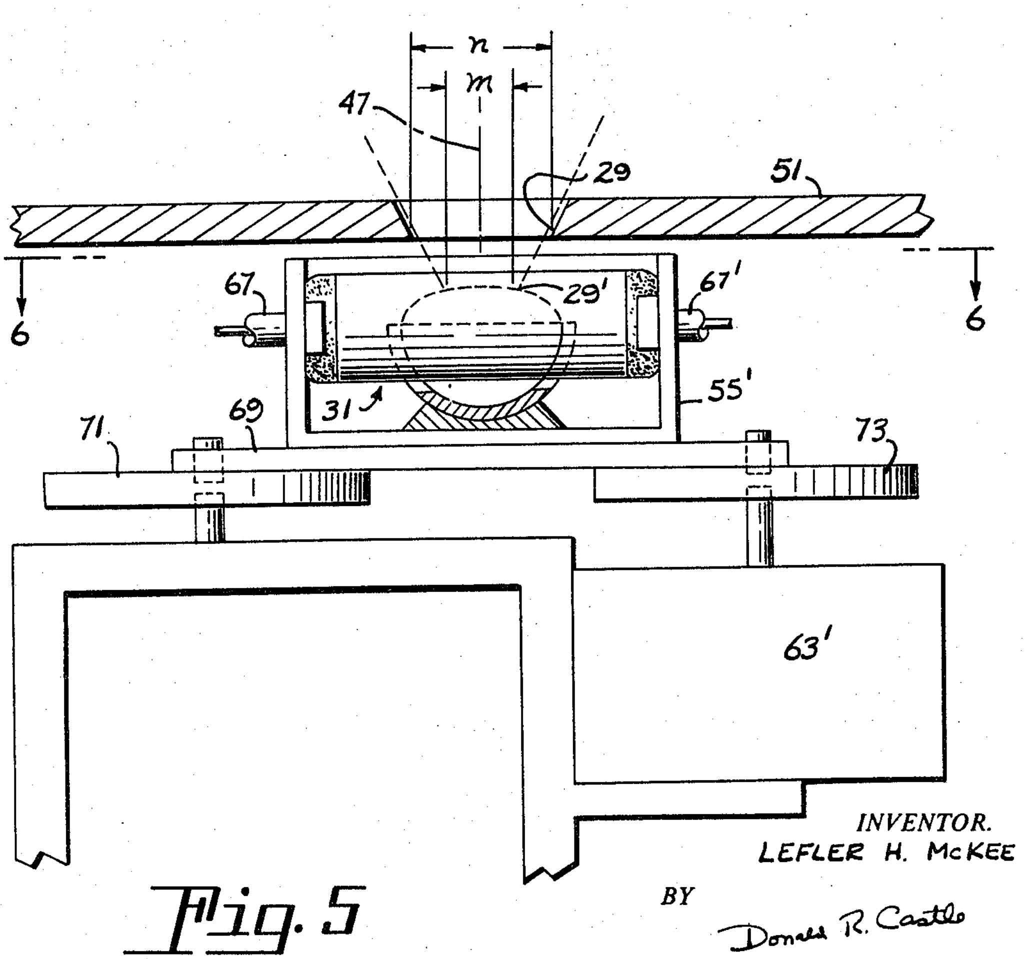
FIG. 5 is an elevational view taken along line 5—5 of FIG. 6 illustrating another embodiment for effecting predetermined movement of the direct light source.

Another embodiment for effecting desired movement of the direct light source is shown in FIGS. 5 and 6 wherein rotating motion is imparted to the light source to effect a simulated source of larger area. The movement is in a predetermined manner relative to the aperture. The partial closure 55' for the lamp is similar to partial closure 55 employed in the first embodiment except that closure 55' is attached to a movable rod 69, one end of which is pivoted on an eccentric idler 71 with the other end pivoted on a powered eccentric 73 actuated by motor means 63'. By this embodiment, the utilized portion of the light source is moved in a circular manner about the axis of the aperture. Movement of the lamp is facilitated by flexible electrical connections 67 and 67'.

The rate or frequency of movement of the light source should be sufficient to maintain a constant rate of polymerization of the light sensitive material in the screen. It has been found that about 1 c.p.s. represents a minimum frequency, while the maximum frequency may be determined by the mechanics of the system. In any case, it should be less than the resonant frequency of any portion of the associated system.

It has been found that the afore-described method of utilizing the optical system by positioning the coated panel in spaced relationship with the apertured light encolsure and moving the unattenuated light source to provide a simulated light source area, has produced several highly beneficial results. Firstly, the unattenuated ultraviolet radiation has notably reduced the screen exposure time by a factor of 50 to 65 percent over the conventionally used quartz rod point-light-source. Secondly, a much lower wattage lamp can be efficiently used with a larger portion of the ultraviolet radiation being utilized. Thirdly, employment of the lower wattage lamp does not require the expensive forced-air cooling or the elaborate and space consuming "plumbing" required therefor. Fourthly, elimination of the forced-air "plumbing" improves the efficiency of the spherical reflector 45 since detractive air ports in the reflective surface are omitted. Thus, the method of the invention beneficially facilitates a speed-up of cathode ray tube screen exposure production in a highly efficient and economical manner.

While there have been shown and described what are at present considered the preferred embodiments of the invention, it will be obvious to those skilled in the art that various changes and modifications may be made therein without departing from the scope of the invention as defined by the appended claims.

I claim:

1. In a method for photo-forming a patterned cathodoluminescent screen comprised of a plurality of separate color fields disposed on a cathode ray tube viewing panel, each of said color fields of the patterned screen being formed in a specific relationship to the central axis of said panel from a light sensitive coating and a respective phosphor material by separate exposures through a negative mask is spacedly positioned relative thereto, and wherein an unattenuated direct light source of an area smaller than an associated aperture is utilized for discretely forming each of said color fields, the improved method comprising the steps of:

positioning said coated and masked panel in a screen exposure apparatus utilizing an optical exposure system formed of an apertured light enclosure wherein an unattenuated direct light source is accommodated, said aperture being of a predetermined area larger than said light source area, said system being oriented relative to said screen axis in a distinct position for each screen pattern exposure; and moving said direct light source in a substantially continuous predetermined manner relative to said aperture in a plane substantially parallel to the plane of said aperture to effect a simulated light source area of substantially unattenuated radiant energy emission, said simulated light area at least equalling the effective area of said aperture in the plane of the light source to provide uniform exposure for forming said screen pattern.

2. A method for photo-forming a cathode ray tube screen according to claim 1 wherein the movement of said unattenuated light source is performed in a substantially reciprocating manner.

3. A method for photo-forming a cathode ray tube screen according to claim 1 wherein the movement of said unattenuated light source is performed in a substantially rotating manner.

4. A method for photo-forming a cathode ray tube screen according to claim 1 wherein the frequency of movement imparted to said unattenuated light source is less than the resonant frequency of any portion of the associated exposure apparatus.

5. A method for photo-forming a cathode ray tube screen according to claim 1 wherein a corrective lens is positioned intermediate said light source and said screen.

6. In a method for photo-forming a plurality of separate color fields of a patterned cathodoluminescent screen disposed on a cathode ray tube viewing panel having a screen related axis therethrough and a foraminous mask spacedly positioned relative thereto, each of said color fields being formed of a light sensitive substance such as a photopolymer and a respective phosphor material, an improvement in said method wherein an unattenuated direct light source is utilized for discretely photo-polymerizing each of said color fields, said improved method comprising the steps of:

positioning said coated and masked panel in a screen exposure apparatus employing said unattenuated direct light source of given intense area, said light source being mounted for movement in a predetermined manner during screen exposure and having its axis oriented in spaced relationship to said screen axis to provide a distinct off-center position for each screen pattern exposure; and moving said unattenuated light source in a predetermined continuous manner substantially lateral to each off-center light source position to effect a simulated light source area larger than said intense area to provide a predetermined pattern of exposure illumination for polymerizing each of said separate fields.

References Cited

UNITED STATES PATENTS

| | | | |
|---|---|---|---|
| 3,211,067 | 10/1965 | Kaplan | 95—1 R |
| 2,625,734 | 1/1953 | Law | 96—36.1 |

FOREIGN PATENTS

| | | | |
|---|---|---|---|
| 222,747 | 6/1958 | Australia | 96—36.1 |
| 573,621 | 4/1959 | Canada | 95—1 R |
| 1,203,791 | 1/1960 | France | 96—36.1 |

NORMAN G. TORCHIN, Primary Examiner

J. WINKELMAN, Assistant Examiner

U.S. Cl. X.R.

96—27 E

PO-1050
(5/69)

UNITED STATES PATENT OFFICE
CERTIFICATE OF CORRECTION

Patent No. 3,667,947 Dated June 6, 1972

Inventor(s) Lefler H. McKee

It is certified that error appears in the above-identified patent and that said Letters Patent are hereby corrected as shown below:

Col. 5, Claim 1, Line 38, remove "is"

Col. 5, Claim 1, Line 49, remove "screen" and insert --- panel ---

Signed and sealed this 24th day of October 1972.

(SEAL)
Attest:

EDWARD M.FLETCHER,JR.
Attesting Officer

ROBERT GOTTSCHALK
Commissioner of Patents